R. L. LOVELL.
STUFFING BOX.
APPLICATION FILED OCT. 9, 1909.

980,542.

Patented Jan. 3, 1911.

2 SHEETS—SHEET 1.

Witnesses:
J. Ellis Elen
J. Earl Ryan

Inventor:
Ralph L. Lovell,
by Albert G. Davis
His Attorney

R. L. LOVELL.
STUFFING BOX.
APPLICATION FILED OCT. 9, 1909.

980,542.

Patented Jan. 3, 1911.

2 SHEETS—SHEET 2.

Witnesses:
J. Ellis Elen
J. Earl Ryan.

Inventor:
Ralph L. Lovell,
by Albert S. Davis
His Attorney.

UNITED STATES PATENT OFFICE.

RALPH L. LOVELL, OF QUINCY, MASSACHUSETTS, ASSIGNOR TO GENERAL ELECTRIC COMPANY, A CORPORATION OF NEW YORK.

STUFFING-BOX.

980,542. Specification of Letters Patent. Patented Jan. 3, 1911.

Application filed October 9, 1909. Serial No. 521,948.

*To all whom it may concern:*

Be it known that I, RALPH L. LOVELL, a citizen of the United States, residing at Quincy, in the county of Norfolk and State of Massachusetts, have invented certain new and useful Improvements in Stuffing-Boxes, of which the following is a specification.

This invention relates to devices for making a fluid-tight joint around a shaft where it passes through the wall of a casing containing elastic fluid under pressure.

The invention is especially applicable to steam turbines and will be described in that connection, though not confined thereto. In large turbines the casing is necessarily made in parts which are bolted together, and it is customary to have the plane of meeting coincide with a diametrical plane of the turbine shaft, each half of the casing containing a half of the opening through which the shaft passes. Up to a certain point, depending upon the size of the casing and the pressure of the steam, these halves of the casing can be secured together tightly enough by bolts passing through flanges on the said halves. But in the largest sizes, where the turbine is designed to develop several thousand horse power, it has been found impossible to make a tight joint around the shaft by ordinary bolt fastenings. With a casing several feet in diameter and a steam pressure of 150 or 200 pounds per square inch, the joint between the halves of the casing is almost certain to open and leak adjacent to the shaft opening.

My invention aims to prevent this, and to this end it consists in part of a continuous reinforcing ring or hoop applied to an annular flange concentric with the shaft opening. This ring also serves as one chamber of a stuffing-box containing a multiple shaft packing, as hereinafter set forth and particularly pointed out in the claims.

Figure 1:
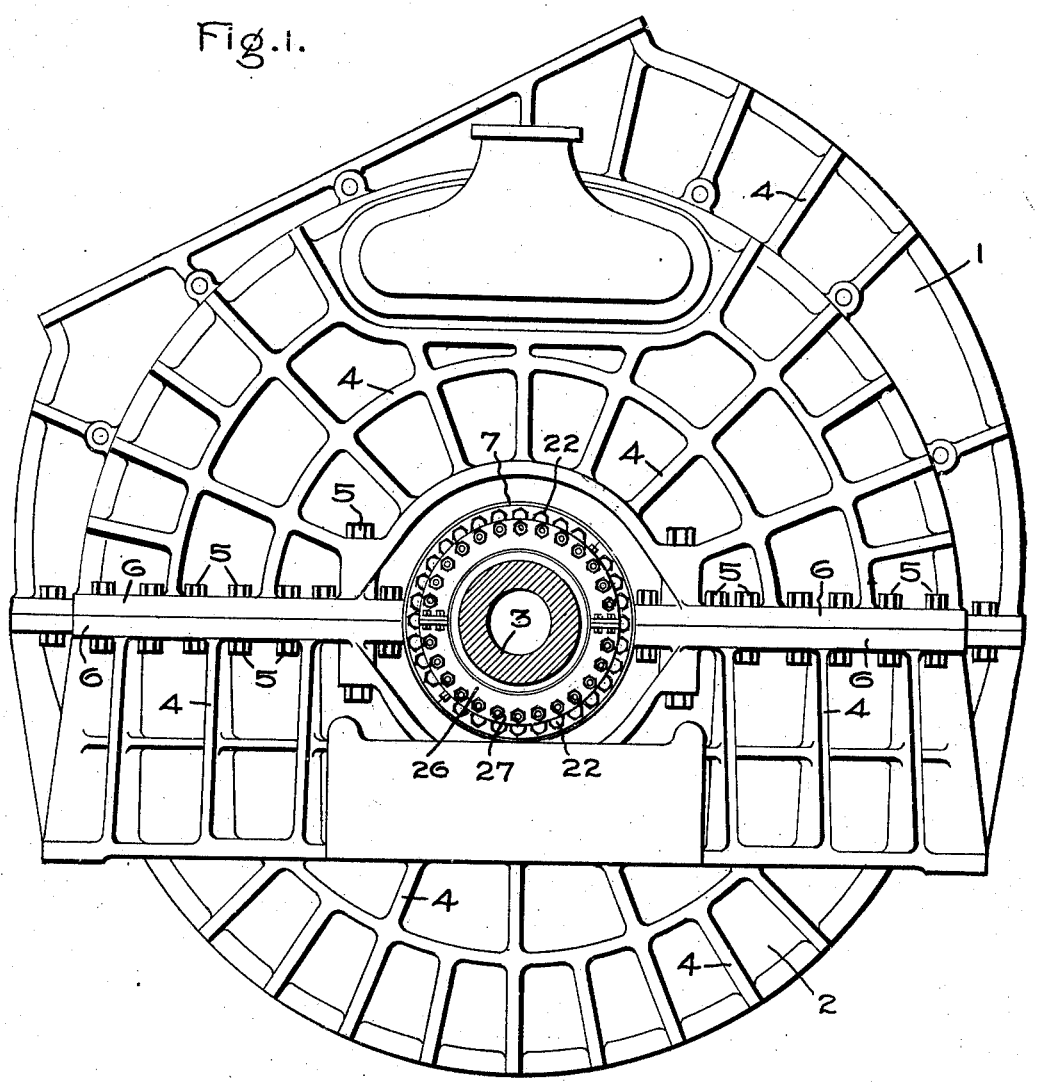
Figure 2:
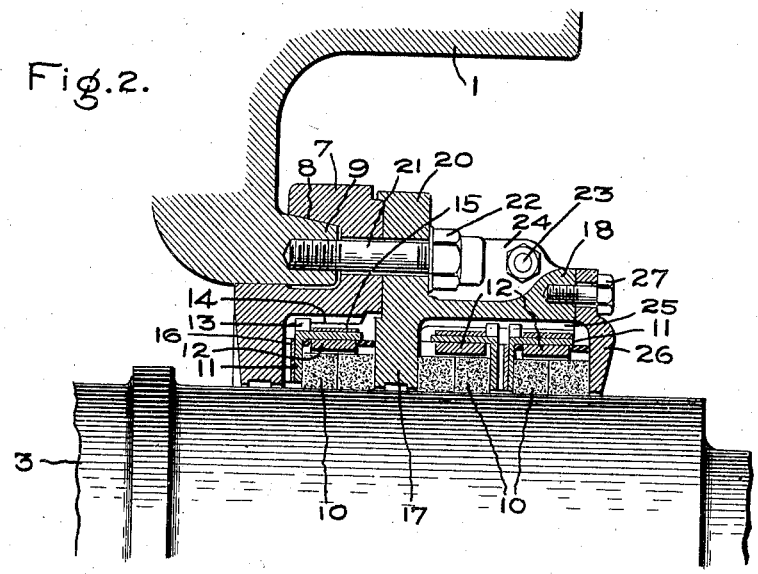
Figure 3:
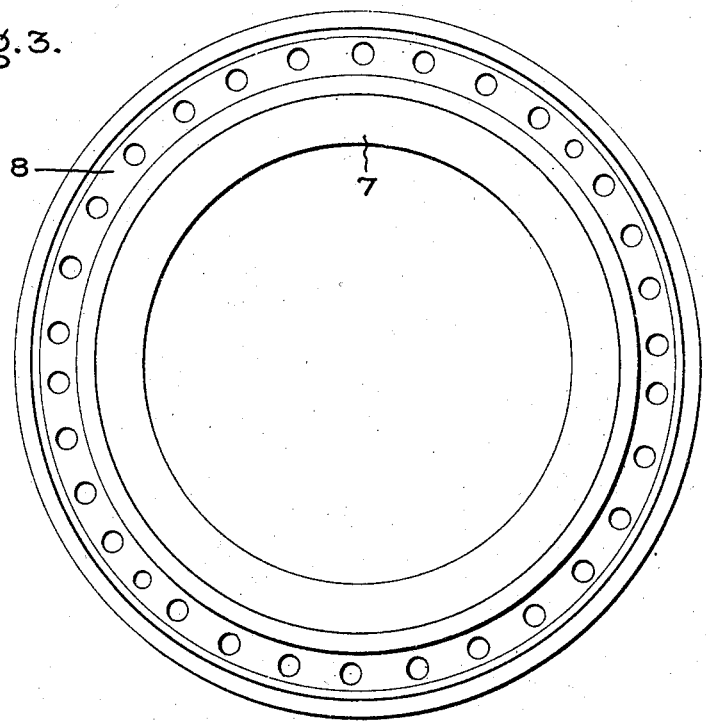

In the accompanying drawings, Figure 1 is an end elevation of a horizontal or marine turbine of large size equipped with my invention; Fig. 2 is a sectional detail showing the shaft, casing, hoop and packing; and Fig. 3 is an elevation of the reinforcing hoop.

The turbine casing is made in halves 1, 2 which meet on a plane diametrical to the shaft 3. The casing is composed of castings which are provided with a network of integral ribs 4 to give them strength and rigidity to resist the stresses due to the internal steam pressures to which the casing is subjected, and also the warping tendencies due to heating. The halves 1, 2 are fastened together by stout bolts 5 passed through holes in flanges 6 at the meeting line of said halves. The opening for the shaft is of considerably greater diameter than said shaft, in order to accommodate a packing or stuffing box which renders the joint steam-tight. One element of said stuffing box is a strong continuous ring or hoop 7 which has a deep annular groove 8 adapted to engage with a flange 9 on the casing, the flange on each part of said casing forming a semicircle and the ends of the two semicircles meeting so that there is formed a circular projection concentric with the shaft openings. One face of the flange 9 and one wall of the groove 8 are somewhat beveled, so that the hoop makes a tight fit on said flange. Any tendency of the halves of the casing to separate under heavy steam pressure is effectually resisted by this continuous reinforcing hoop. The hoop is counterbored to form part of the stuffing box for the shaft. The counterbore makes a chamber for a portion of the shaft packing, which comprises a plurality of carbon or other packing-rings 10. There are preferably two rings in the chamber of the hoop, placed side by side on the shaft, and held from rotation by an angle piece 11 which has a key 12 engaging with the packing-rings, and also a lug 13 engaging a shoulder 14 on the hoop. Leaf springs 15, 16, respectively, press the packing-rings upon the shaft and against the bottom 17 of the outer portion 18 of the stuffing box. A flange 20 on this portion of the box rests against the hoop 7 and screw studs 21 pass through said flange and hoop into the flange 9 on the casing, having nuts 22 which clamp these parts firmly together.

The stuffing box 18 is made in halves assembled around the shaft and screwed together by bolts 23 passing through meeting flanges 24. The box incloses preferably two pairs of packing-rings, each pair having a holder 11, key 12, lug 13 engaging a shoulder 25 in said stuffing box, and springs 15, 16. The springs 16 urge said holders 11 apart, pressing one pair of rings against the bottom of the stuffing box and the other pair against the cover 26 of said box, which is secured thereto by screws 27; the cover, like the box, being made in halves bolted together.

This stuffing box and reinforcing ring have proved in practice to be entirely satisfactory, and to overcome the difficulty heretofore experienced with large turbine casings as hereinbefore referred to.

What I claim as new and desire to secure by Letters Patent of the United States, is:

1. A turbine casing having a circular flange around its shaft opening, and a reinforcing hoop applied to said flange.

2. A turbine casing made in halves and having a shaft opening at the line of meeting of said halves, a circular flange on said casing concentric with said opening, and a reinforcing hoop engaging with said flange.

3. A turbine casing made in halves and having a shaft opening at the line of meeting of said halves, a semicircular flange on each half concentric with the shaft opening, and a reinforcing hoop having a groove engaging with said flange.

4. A turbine casing having a circular flange around its shaft opening, and a continuous reinforcing hoop engaging with said flange and counterbored to form part of a stuffing box for the shaft.

5. A turbine casing having a circular flange around its shaft opening, a continuous counterbored hoop engaging with said flange, and a stuffing box having a flange secured to said hoop and forming an outer wall for said counterbore.

In witness whereof, I have hereunto set my hand this sixth day of October, 1909.

RALPH L. LOVELL. [L. S.]

Witnesses:
   S. T. MacQuarrie,
   Lucy C. Hollis.